United States Patent [19]

Steenolsen

[11] 3,864,503

[45] Feb. 4, 1975

[54] METHOD OF PACKAGING SELF-BASTING POULTRY

[75] Inventor: Ken Steenolsen, South Pasadena, Calif.

[73] Assignee: Poppy Food Company, Los Angeles, Calif.

[22] Filed: June 12, 1972

[21] Appl. No.: 261,819

[52] U.S. Cl. ............... 426/232, 53/59 W, 426/305, 426/307, 426/393, 426/412, 426/124, 426/129
[51] Int. Cl....................... B65b 29/08, B65b 25/22
[58] Field of Search... 99/171 H, 169, 174, 171 CA, 99/107; 53/59 W; 426/232, 305, 307, 393, 412, 124, 129

[56] References Cited
UNITED STATES PATENTS

| | | | |
|---|---|---|---|
| 2,759,830 | 8/1956 | Touceda | 99/171 H |
| 2,902,371 | 9/1969 | Shorr | 99/171 H |
| 3,042,532 | 7/1962 | Daline | 99/171 H |
| 3,132,029 | 5/1964 | Beck | 99/171 H X |
| 3,399,507 | 9/1968 | Litchard | 53/59 W |
| 3,483,004 | 12/1969 | Bauer et al. | 99/107 X |
| 3,516,537 | 6/1970 | Dreyfus | 99/171 P UX |
| 3,623,892 | 11/1971 | Koonz et al. | 99/107 X |
| 3,708,312 | 1/1973 | Malinow | 99/174 X |
| 3,716,369 | 2/1973 | Perlman | 426/412 X |
| 3,720,039 | 3/1973 | Warkentin | 53/59 W |

FOREIGN PATENTS OR APPLICATIONS

| | | | |
|---|---|---|---|
| 149,403 | 12/1952 | Australia | 426/412 |

*Primary Examiner*—Frank W. Lutter
*Assistant Examiner*—Steven L. Weinstein

[57] ABSTRACT

A method of processing poultry, poultry parts, or poultry meat, by placing same in a bag and then inserting a selected (and preferably carefully weighed) quantity of basting and seasoning material into the bag before evacuating and closing and sealing the bag. The product may be conveniently distributed in the bag, and is adapted for quick cooking in the bag, whether distributed in fresh or frozen state.

8 Claims, No Drawings

METHOD OF PACKAGING SELF-BASTING POULTRY

BACKGROUND OF THE INVENTION

It has heretofore been known to process poultry by adding a quantity of basting and seasoning material so that the poultry parts, or poultry meat can be cooked in a self-basting fashion. However, difficulty has been experienced in obtaining a precise control of the weight of the basting and seasoning material, and such precise control is required by present regulations of the United States Department of Agriculture.

Furthermore, the conventional manner of packaging poultry, poultry parts, and poultry meat has not resulted in a package which was usable for the purpose of cooking the product. Consequently, the housewife or other consumer must remove the product from the bag in which it is purchased, and cook it in another container. Where the product is distributed in frozen form this is particularly inconvenient and time-consuming, since a number of hours must be allowed for the product to thaw before it can be removed from its original package.

One object of the invention, therefore, is to provide for the processing of poultry in such manner that the original package that is used for distributing the product may also be used for cooking it.

A further object of the invention is to provide a method of processing poultry for marketing or distribution, in which basting and seasoning material may be added to the product in precisely controlled amounts.

According to the preferred form of my invention the bird is killed and dressed in the usual manner. The neck and giblets are then placed in a separate bag.

The bird is placed inside a polyester bag which is kept open at one end. It will be noted that one important characteristic of the polyester material is that it is capable of withstanding cooking temperatures of the order of 350° F, for example.

As the next step, a desired quantity of basting and seasoning material is inserted into the interior of the polyester bag, through its open end. The basting and seasoning material is preferably in a semi-liquid form, and may be conveniently dispensed from an applicator which the production line worker squeezes by hand. The basting and seasoning material may then be squirted onto the surface of the bird, inside the polyester bag, at different points around the circumference of the bird.

Although my invention is by no means limited to any particular combination of ingredients for the basting and seasoning material, a particular group of ingredients which may be used are as follows:

For the pre-seasoning ingredients it may be desired to use salt, monosodium glutamate, hydrolized vegetable protein, sugar, sodium phosphates, flavoring and lemon juice powder.

For the basting ingredients it may be desirable to use vegetable oil with color added.

According to present practice it is preferred to add basting and seasoning material in an amount equal to approximately 3 percent by weight of the bird itself. My method facilitates a precise control of the weight of the material that is added, because of the fact that the material is inserted inside the polyester bag and is then given no opportunity to escape from the bag.

Therefore, when the basting and seasoning material is being squirted into the interior of the bag, it is preferred to have the bag containing the bird rest upon a scale. The operator, while inserting the basting and seasoning material into the bag, watches the weight indicated by the scales. A chart is preferably used to guide the work of the operator so that he or she can add an appropriate amount of the basting and seasoning material, such as, preferably, precisely 3 percent of the weight of the bird itself.

The bag containing the bird is then placed under a suction pump and the open end of the bag is placed up, over and around the pump. The upper end of the bag is twisted around the pump to provide a relatively airtight seal, and is held there by the hand of the operator while the bag is being evacuated. It will, of course, be understood that in order to accomplish this part of the process it is necessary that the length of the bag be considerably greater, in the first instance, than the length of the bird. When the bag becomes evacuated, the operator continues to hold the top of the bag grasped tightly around the pump; spins the bag with the bird inside so as to twist the neck or top portion of the bag, thus tightening it below the pump; then puts a fastening clamp on the twisted neck of the bag, and cuts off the excess end portion of the bag. Thus the bag has been evacuated, and its upper end closed and sealed.

The next step of the process is to briefly apply heat to the external surface of the bag so as to shrink the bag tightly around the poultry, poultry part, or poultry meat, together with the basting and seasoning material, and also to partially melt the basting and seasoning material. For this purpose it is desirable to apply a temperature of about 180° F to 200° F and for a time interval of about 2 to 5 seconds. The necessary heating action may be achieved by subjecting the bag to a stream of hot air, as one example. Or the bag, containing the bird, may be placed upon a conveyor to move through a tunnel and within the tunnel have a shower which showers hot water down upon and around the bag. The conveyor and hot water shower arrangement is automated and is very fast, and saves hand labor. However, the method that I prefer for applying heat is to use a bath of hot water, having a temperature of about 180° F to about 200° F.

When the hot water bath is used for shrinking the bag, it is desirable to place the bag containing the bird inside a netting sack. The production worker then grasps the upper end of the sack and uses the sack to lower the bag, containing the bird into the hot water of the bath. The heating time is preferaby 2 to no more than about 5 seconds. This heating action shrinks the polyester bag tightly around the bird, as well as around the basting and seasoning material. There is now a smooth surface around the entire periphery of the bird.

After the polyester bag has been shrunk, the bag and its contents are then subjected to atmospheric temperature for a period of time in order to further disseminate the basting and seasoning material. Preferably this time interval is approximately 12 hours. Of course, if the bird is going to be distributed or sold as a fresh product, then this aging period can be achieved during the time that the distribution process has been initiated. However, if the bird is going to be distributed as a frozen product, then the aging period takes place in the processing plant, and the bird is then frozen at the end of this aging period.

It is then preferred to place the separate giblet sack on the inside of the netting sack. The netting sack is spun to twist the neck of the sack, is clamped at the neck, and the excess material is cut off. The bird is then ready to be distributed, with both the bird itself and the giblets being contained inside the same netting sack.

When the customer receives the product he may cut open the netting sack, remove the separate polyester bag containing the giblets, and may then cook the bird in its own separate polyester bag. The bird may be boiled in hot water at the usual boiling temperature, or it may be roasted in an oven at about 350 degrees F. Even if the bird is frozen, giblet gravy may be prepared while the bird is cooking.

It is preferred to utilize a bag of the type disclosed in U.S. Pat. No. 3,478,952 and U.S. Pat. No. 3,578,239. An advantage of this type of bag is that it opens up when it reaches a certain cooking temperature. Thus, in accordance with the preferred form of my method, it is preferred to select a polyester bag which has the capability of opening up when a certain cooking temperature has been reached. This type of bag provides the benefit of pressure cooker cooking, and after it opens up upon reaching a certain cooking temperature the subsequent portion of the cooking process is then a genuine roasting process.

As will be understood by those skilled in the art, what has been described are preferred embodiments in which modifications and changes may be made without departing from the spirit and scope of the accompanying claims.

What is claimed in support of Letters Patent is:

1. The method of packaging a food item for self-basting cooking, comprising the steps of:
   a. placing the food item inside a polyester bag which is open at one end;
   b. inserting a selected quantity of semi-liquid basting and seasoning material into the bag at different points on the peripheral surface of the food item;
   c. evacuating the bag through its open end, and then closing and sealing it;
   d. briefly applying heat to the external surface of the bag sufficient to shrink the bag tightly around the food item and its accompanying basting and seasoning material, so as to spread the basting and seasoning material in a thin coating about the food item, said heat being effective to partially melt the basting and seasoning material; and
   e. subjecting the bag and its contents to atmospheric temperature for a period of time sufficient to further disseminate the basting and seasoning material;
   the packaged product being then adapted for quick cooking of the food item in the bag.

2. The method of packaging poultry, parts thereof, or poultry meat, for self-basting cooking, comprising the steps of:
   a. placing the poultry, poultry part, or poultry meat inside a polyester bag which is open at one end;
   b. inserting a selected quantity of basting and seasoning material in a semi-liquid form into the bag at different points on the surface of the poultry, poultry part, or poultry meat;
   c. evacuating the bag through its open end, and then closing and sealing it; and
   d. briefly applying heat to the external surface of the bag sufficient to shrink the bag tightly around the poultry, poultry part, or poultry meat and its accompanying basting and seasoning material so as to spread the basting and seasoning material in a thin coating about the poultry, poultry part, or poultry meat, said heat being effective to partially melt the basting and seasoning material;
   the package product being then adapted for quick cooking of the poultry, poultry part, or poultry meat in the bag.

3. The method of packaging poultry, parts thereof, or poultry meat, for self-basting, comprising the steps of:
   a. placing the poultry, poultry part, or poultry meat inside a polyester bag which is open at one end;
   b. inserting a selected quantity of semi-liquid basting and seasoning material into the bag at different points on the peripheral surface of the poultry, poultry part, or poultry meat;
   c. evacuating the bag through its open end, and then closing and sealing it;
   d. briefly applying heat to the external surface of the bag sufficient to shrink the bag tightly around the poultry, poultry part, or poultry meat and its accompanying basting and seasoning material, said heat being effective to partially melt the basting and seasoning material; and
   e. subjecting the bag and its contents to atmospheric temperature for a period of time sufficient to further disseminate the basting and seasoning material;
   the packaged product being then adapted for quick cooking of the poultry, poultry part, or poultry meat in the bag.

4. The method claimed in claim 3 wherein the bag and its contents are placed upon a scale during the time when the basting and seasoning material is being inserted, thereby making it possible to obtain a precise measurement of the weight of such added material inasmuch as the bag is then closed and sealed before any part of the basting and seasoning material is permitted to escape therefrom.

5. The method of claim 3 which includes the additional and final step following step (e) of then freezing the bag and its contents, the product being then adapted for quick cooking in the bag without the necessity for first thawing it out.

6. The method of claim 5 wherein said poultry packaged in said bag is a dressed bird, and which includes the further step of placing the giblets in another bag and placing both bags in a common container, whereby the consumer may prepare giblet gravy while the frozen bird is being cooked in its own separate bag.

7. The method of claim 3 wherein said heat is applied to the external surface of the bag by immersing it in a bath of hot water.

8. The method claimed in claim 7 wherein the temperature of said bath of hot water is maintained at about 180° F to about 200° F, and the bag and contents are immersed for about 2 to 5 seconds.

* * * * *